United States Patent [19]

Hirose et al.

[11] Patent Number: 4,665,478
[45] Date of Patent: May 12, 1987

[54] COMPUTER SYSTEM

[75] Inventors: Tadashi Hirose, Komae; Kousuke Sakoda, Hino; Tomihiko Kojima, Machida; Hidehiko Akita, Tokyo; Tsutomu Miyairi, Yokohama, all of Japan

[73] Assignee: Hitachi, Ltd., Tokyo, Japan

[21] Appl. No.: 640,568

[22] Filed: Aug. 14, 1984

[30] Foreign Application Priority Data

Aug. 15, 1983 [JP] Japan .............................. 58-149049

[51] Int. Cl.[4] ............................................. G06F 3/00
[52] U.S. Cl. ................................................ 364/200
[58] Field of Search ... 364/200 MS File, 900 MS File

[56] References Cited

U.S. PATENT DOCUMENTS 4,166,945 9/1979 Inoyama et al. .................... 364/900

Primary Examiner—Raulfe B. Zache
Attorney, Agent, or Firm—Antonelli, Terry & Wands

[57] ABSTRACT

A computer system comprises a memory for storing communication history information between a terminal and an execution program, and an output message file for storing sets of communication history conditions and output messages corresponding to those conditions. When the terminal issues a message output request, only the output message that meets the communication history condition is selected from the output message file and outputted to the terminal.

4 Claims, 9 Drawing Figures

COMPUTER SYSTEM

The present invention relates to a computer system, and more particularly to a computer system for selecting an output message in accordance with interactive communication logging information between a time sharing system (TSS) computer and a terminal.

In the TSS, a number of users share one computer to process jobs while directly controlling executions of their own jobs. In this system, not only the sharing of the computer is intended but also interactive communications between operators and the computer are intended.

A TSS computer having variety of functions has a message output system which contains messages for operation guidance therein and outputs them as required. The output messages include an explanation for the operation, such as command input, explanation of an input error and an execution error and explanation of countermeasures for those errors.

Requests to output the messages are issued by a plurality of execution programs stored in the computer system. Each execution program issues the message output request together with a predetermined message identifier such as an unexpected event during the execution.

In the prior art message output system, a corresponding message text is retrieved from a message file based on the output request issued by the execution program and outputs it to a terminal.

However, the prior art system cannot output an exact message to the terminal user.

Usually, a user task is transmitted to the computer system by a plurality of command (task request) inputs. Each command (task request) is executed by a plurality of execution programs determined to be necessary for the task based on simultaneously inputted parameters or data in the system. Accordingly, the content of the output message requested by the execution program cannot but be phenomenon descriptive. For example, when the execution program detects an error and issues an error message, the phenomenon is one, but several causes therefor may be present. However, it is not practical to list all of the causes and output them to the terminal. In the prior art system, only a message for explaining the phenomenon is outputted. In order to interprete the meaning of the message and analyze the cause, a knowledge of the configuration of the execution program in the computer system is required. Therefore, it is not appropriate to a beginner or an unexperienced operator.

In order to output only the exact message to the terminal user, a message output system is needed which predicts all possible causes and outputs only the necessary message.

It is an object of the present invention to provide a computer system which predicts several causes and outputs only the message necessary to the terminal.

In order to achieve the above object, in accordance with the computer system of the present invention, there is provided a computer system for outputting a message for an operation guidance to the terminal comprising means for logging communication information between each terminal and execution programs and an output message file for storing a plurality of sets of communication history conditions and output messages, wherein when a message output request is issued from the computer system or the terminal, only the output message which meets the communication history condition is selected from the output message file and outputted to the terminal.

The present invention will be apparent from the following detailed description taken in conjunction with the accompanying drawings, in which:

FIG. 1 shows a configuration of a prior art message output system,

FIG. 2 shows a configuration of one embodiment of a computer system of the present invention, FIG. 3 shows a configuration of programs, a table and a file in the embodiment of the present invention, FIG. 4 shows a configuration of a history information logging system of FIG. 3, FIG. 5 shows a configuration of a message file of FIG. 3, FIG. 6 is a flow chart showing processing content of a selection program of FIG. 3, and FIGS. 7A, 7B and 7C show a table and a file when the present invention is applied to a specific computer system.

In order to facilitate the understanding of the present invention, a computer system having a conventional message output system will be first explained.

FIG. 1 shows a configuration of the computer system having the conventional message output system.

In FIG. 1, numeral 001 denotes a terminal, numeral 002 denotes execution programs, numeral 005 denotes a message output system and numeral 008 denotes a message file. In the conventional message output system, a desired message text is retrieved from the message file 008 based on an output request 006 issued from the execution program and it is outputted from the message output system 005 to the terminal 001. In this system, however, a correct message cannot be outputted to the terminal user.

An embodiment of the present invention will now be explained with reference to FIG. 2 which shows a configuration of the embodiment of the computer system of the present invention.

In FIG. 2, numeral 101 denotes a TSS terminal for inputting a command, numeral 102 denotes a processor for processing data, numeral 103 denotes a main memory (MM), and numeral 104 denotes an auxiliary storage such as a disk which is used to store a message file 105 and a status definition table 106.

In the present invention, the operation history in the terminal 101 is retained and it is used for the selection of the output message. To this end, communication information between the terminal 101 and the programs executed by the processor 102 is stored in the auxiliary storage 104, and only the message that will be required by the terminal user is selected from the messages designated by the output request from the program and it is outputted to the terminal.

FIG. 3 shows a configuration of the programs, the table and the file in the embodiment of the present invention.

In FIG. 3, numeral 201 denotes an input/output control program for controlling the input/output of the TSS terminal, numeral 202 denotes an execution program for executing a command inputted from the terminal, numeral 203 denotes a monitor program for monitoring communication information between the input/output control program 201 of the terminal and the execution program 202, numeral 204 denotes a history information logging system for logging communication information taken out of the monitor program 203 and determining a status of the terminal, and numeral 205 denotes a selection program for accepting a message output request (206) and selecting a message to be outputted from the message file 105 on the basis of the message output request and the information of the history information logging system 204.

As seen from FIG. 3, the monitor program 203 monitors the communication information between the execution program 202 and the input/output control program 201 of the terminal and stores it in the history logging system 204, and the selection program 205 selects only the message that is required by the terminal user from the messages in the message file 105 designated by the output request 206 from the execution program 202, and outputs it to the terminal. The result of learning of the operation history in the terminal by the monitor program 203 is utilized to select the output message.

FIG. 4 shows a configuration of the history information logging system of FIG. 3.

The history information logging system 204 comprises a status definition table 106, a history table 301 for storing communication history in a FIFO (first-in first-out) fashion and a status table 302. For a computer system which supports a plurality of terminals, the tables 301 and 302 are provided for each terminal. A control program 303 stores the communication information 304 transmitted from the monitor program 203 in the table 301 in the FIFO fashion. Then, it searches a first field 305 of the status definition table 106 to check for the presence or absence of the definition on the received communication information 304. If the definition is present, it reads out a corresponding second field 306 and updates the status table 302 in accordance with the instruction thereof.

The status table 302 represents a status of a job being executed in the terminal. For example, it contains status information such as "process by FORTRAN language" "available memory size is 512K bytes" or "temporary file is named ABC".

FIG. 5 shows a configuration of the message file of FIG. 3.

The message file 105 has a message set 401 for each execution error and each command type as shown in FIG. 5A, and the message set 401 comprises a plurality of message records 402. Each message record 402 has a condition field 403 and a text field 404 as shown in FIG. 5B. The condition field 403 comprises a plurality of condition cells 405.

FIG. 6 shows a flow chart for a processing content of the selection program in FIG. 3.

The selection program 205 selects the output message by the processing steps shown in FIG. 6.

First, the corresponding message set 401 is taken out of the message file 105. The selection is made in accordance with the execution error or the command type information sent with the message output request 206 (step 501). The message record 402 in the selected message set 401 is then taken out (step 502). If the unretrieved message record does not exist in the message set 401, the process terminates (END, step 503). If the unretrieved message record 402 exists, the condition cell 405 is taken out of the condition field of the message record 402 (step 504). If the unretrieved condition cell 405 does not exist in the message record 402, the next message record 402 is taken out and the process returns to the step 502 (step 505).

The tables 301 and 302 are looked up to check if the condition described by the condition cell 405 is met. If it is not met, the next condition cell 405 is taken out and the process returns to the step 504 (step 506). If the condition is met, the message described in the text field 404 of the message record 402 is outputted and the process returns to the step 502 to take out the next message record 402 (step 507).

FIG. 7 shows a specific embodiment of the tables and the file when the present invention is applied to a specific computer system (HITAC M-series VOS 3 System).

FIG. 7A shows the status definition table 106 of the history logging system. The status definition table 106 defines "When a command called FORT is inputted from the terminal, place "F" in the UL field (language being used) of the status table 302, and when a command PASC is inputted, place "P".".

Figure 1:
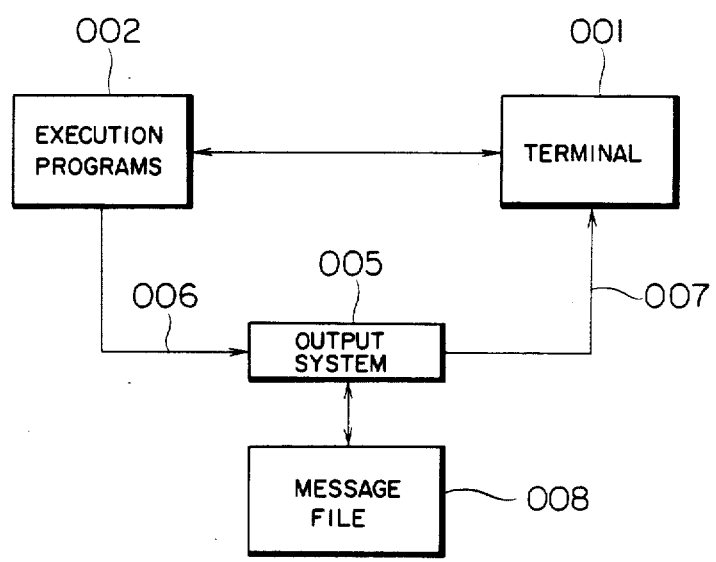
Figure 2:
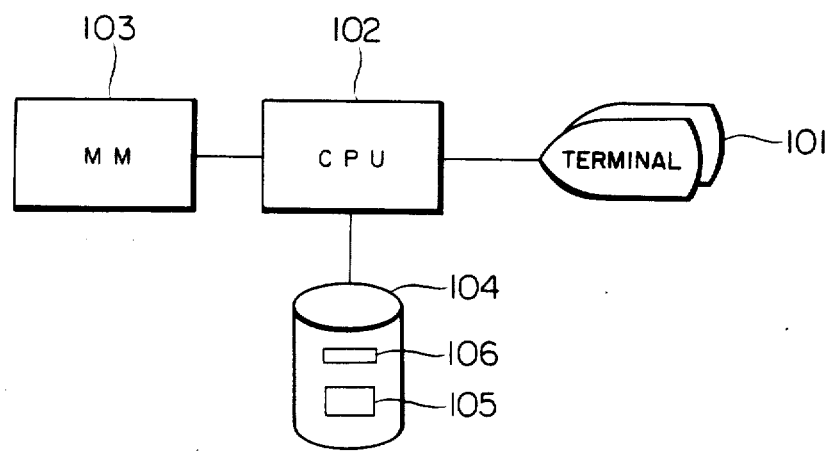
Figure 3:
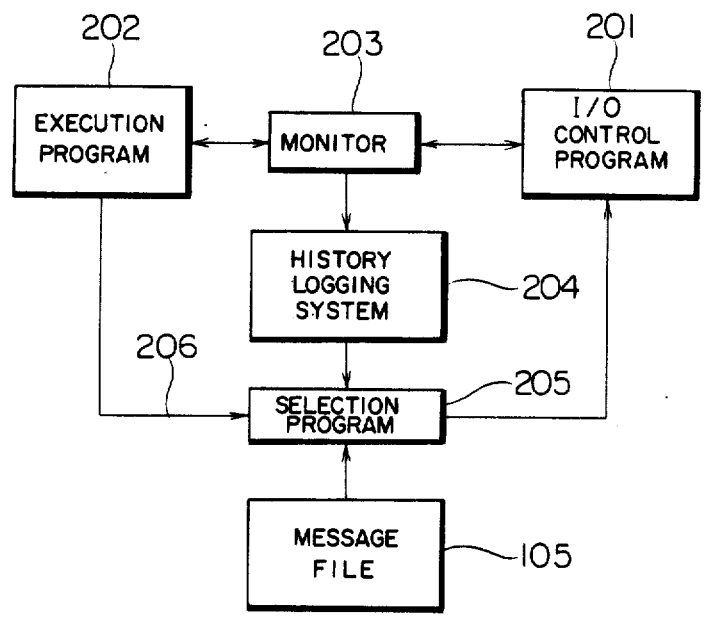
Figure 4:
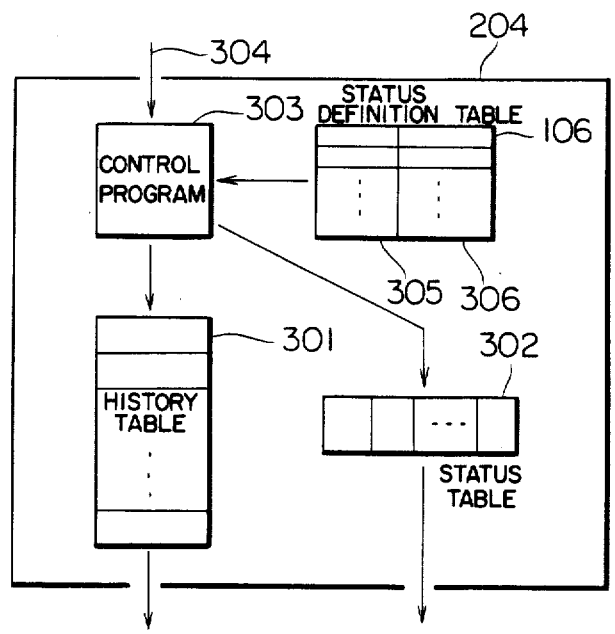
Figure 5:
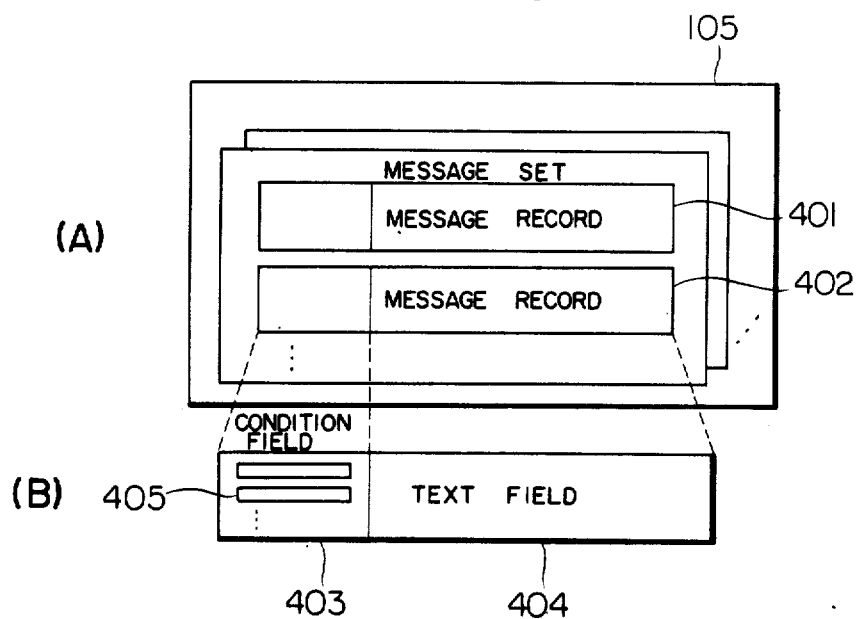
Figure 6:
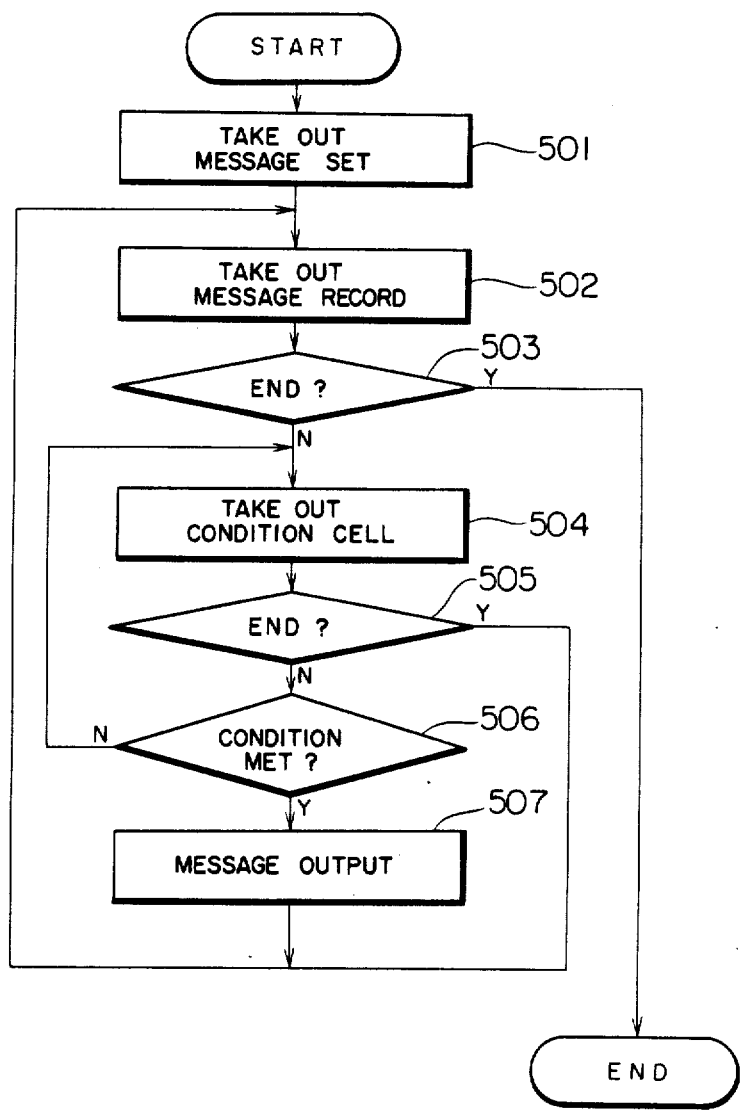
Figure 7A:
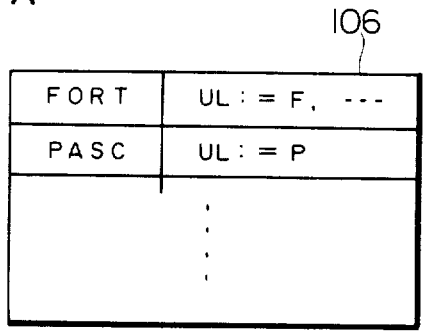
FIG. 7B shows the status table 302 of the history logging system. The status table 302 has various fields, of which the UL field for representing the language being used is shown.
FIG. 7C shows the message set 401 of the message file 105.
Figure 7B:
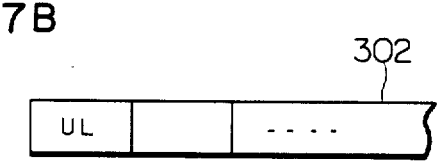
Figure 7C:
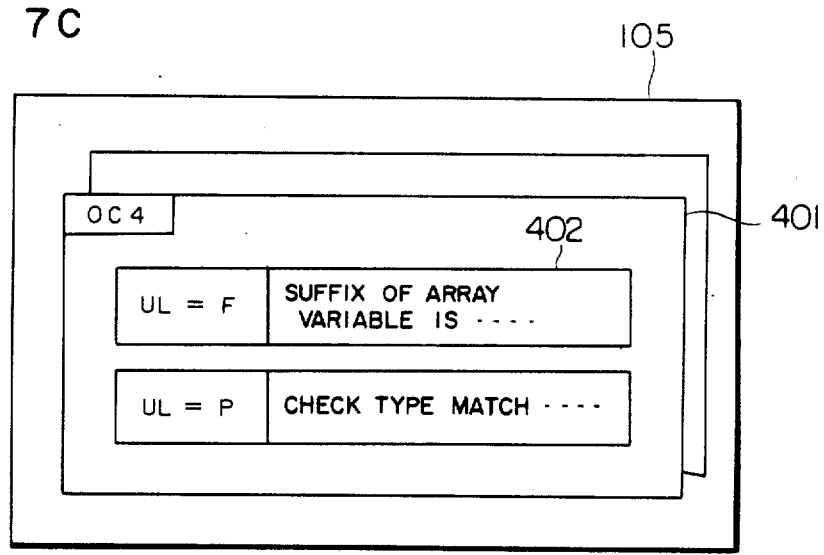

The message file 105 includes the message set 401 corresponding to the message identifier 0C4, and the message text "Suffix of array variable is . . . " which is outputted when the UL field of the status table 302 is "F" and the message text "Check type match . . . " which is outputted when the UL field is "P" are registered in the message set 401. When the terminal user uses the FORT command, the control program 303 sets "F" in the UL field of the status table 302. If the execution program 202 detects the protection error, the 0C4 message output request 206 is issued to the message output system. The selection program 205 of the message output system retrieves the message set 401 corresponding to 0C4 and looks up the status of the status table 302 to output the message text "Suffix of array variable is . . . " and inhibit the output of the message text "check type match . . . ".

Since the output message is selected in accordance with the communication history information, only the message necessary to the terminal user is outputted.

The present invention is more effective on the condition that the task of the terminal user is executed by a plurality of execution programs which are independent from each other. The term independent program means that each execution program does not depend on the execution sequence of other execution programs and it is executed only in accordance with the input data. Such independence of the programs is essential in order to assure easier and general use of the TSS computer system and allow the addition of the new function (execution program) without modifying the existing execution programs.

As explained hereinabove, in accordance with the present invention, the output message is selected in accordance with the communication history information between the execution program and the terminal. Accordingly, not only the error events but also the messages describing the causes therefor are stored in the computer, and when the error event occurs, only the message necessary to the terminal user can be selected from the messages designated by the output request and it is outputted to the terminal. Accordingly, the present invention offers a great advantage when it is applied to a TSS computer.

What is claimed is:

1. A computer system for outputting a message for operation guidance to a plurality of terminals, comprising:
   communication history logging means connected to a communication line extending between said terminals and an execution program for logging histories of communication information between each of the terminals and said execution program;
   an output message file for storing a plurality of sets of communication history conditions and output messages corresponding thereto; and
   message selection means, connected to said communication logging means and said output message file and responsive to the issuing of a message output request from a terminal, for selecting only the output message that meets the communication history condition from said output message file in accordance with the content of said communication history logging means and for outputting the selecting output message to said terminal issuing said message output request.

2. A computer system according to claim 1 wherein said communication history logging means includes a first table for storing the communication information in a first-in first-out fashion, a second table for storing definitions on the stored communication information and a third table for storing a status of a job being executed in said terminal and updating the content thereof in accordance with said second table.

3. A computer system according to claim 1 wherein said output message file has a plurality of message records and stores message sets for each execution error or command type.

4. A computer system according to claim 2 wherein said output message file has a plurality of message records and stores message sets for each execution error or command type.

* * * * *